(12) United States Patent
Stratton

(10) Patent No.: US 6,239,745 B1
(45) Date of Patent: May 29, 2001

(54) SATELLITE LANDING SYSTEM HAVING INSTRUMENT LANDING SYSTEM LOOK ALIKE GUIDANCE

(75) Inventor: D. Alexander Stratton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/364,632

(22) Filed: Jul. 30, 1999

(51) Int. Cl.$^7$ ................................. G01S 1/16; G01S 1/18
(52) U.S. Cl. .................. 342/410; 342/411; 342/357.03; 701/215; 701/17; 701/18; 244/183
(58) Field of Search ..................................... 342/410, 411, 342/357.03; 701/215, 17, 18; 244/183

(56) References Cited

U.S. PATENT DOCUMENTS 5,702,070 * 12/1997 Waid ..................................... 244/183
6,112,141 * 8/2000 Briffe et al. ............................. 701/14

OTHER PUBLICATIONS

D. Alexander Stratton, Rockwell Collins, Inc., Cedar Rapids, IA, "Guidance Characteristics of GNSS Landing Systems," IEEE/AIAA Digital Avionics System Conference, Nov., 1998.

A. Stratton, Rockwell External Memo disclosing concept of lateral offset of the apex of the LAAS conical glide slope from the GRIP, Nov. 3, 1997.

\* cited by examiner

Primary Examiner—Theodore M. Blum
(74) Attorney, Agent, or Firm—Nathan O. Jensen; Kyle Eppele; J. P. O'Shaughnessy

(57) ABSTRACT

Disclosed are a global navigation satellite system (GNSS) landing system (GLS) and methods of using the same to calculate a vertical deviation from the glide slope of the aircraft. A GNSS antenna and position determining circuitry are used to determine the position of the aircraft as a function of received GNSS positioning signals. Vertical deviation computation circuitry coupled to the position determining circuitry calculates an angular vertical deviation $\alpha_v$ from the glide slope of the aircraft as a function of the total horizontal distance between the aircraft and a GLS elevation reference point (GERP).

20 Claims, 8 Drawing Sheets

SATELLITE LANDING SYSTEM HAVING INSTRUMENT LANDING SYSTEM LOOK ALIKE GUIDANCE

FIELD OF THE INVENTION

The present invention relates to aviation electronics (avionics). More particularly, the present invention relates to precision landing systems for aircraft.

BACKGROUND OF THE INVENTION

The article, "Guidance Characteristics of GNSS Landing Systems," Presented in the IEEE/AIAA Proceedings of the 17$^{th}$ Digital Avionics System Conference, November 1998, by D. Alexander Stratton, is herein incorporated by reference.

Precision-landing systems, including instrument landing systems (ILS), global navigation satellite system (GNSS) landing systems (GLS), and microwave landing systems (MLS), provide guidance to the pilot of an aircraft in the form of vertical and lateral deviations from an intended approach path known as the glide path or glide slope. In the aviation industry, technical and operational concepts for precision landing have evolved around the signal in space (SIS)characteristics of the ILS. Significant characteristics of ILS guidance arise from the SIS created by two antenna arrays positioned in the runway area. A glide-slope array located near the touchdown zone provides an ultra high frequency (UHF) signal for vertical guidance, while a localizer array typically located off the runway stop end provides a very high frequency (VHF) signal for lateral guidance.

Each signal contains 90 and 150 Hz amplitude modulations, and the antenna patterns are adjusted so that the modulation depths are equivalent along the final-approach path. Angular displacements from the final-approach path produce proportional changes in the depth of the individual modulations, so that a difference in depth of modulation (DDM) is sensed by an airborne ILS receiver. The proportionality between angular displacement and DDM, called displacement sensitivity, is maintained within specifications by adjustments of the antenna patterns. The receiver's DDM outputs can be displayed "raw" for manually piloted approaches and processed by flight-control systems to produce vertical and lateral steering commands for manual and automatically controlled landings.

In the avionics industry, GLS may be used to replace or supplement conventional ILS. The GNSS used in the GLS can be the global positioning system or other satellite positioning systems. Compatibility with conventional ILS would provide certain advantages to ease the process of replacement or supplementing. For GLS systems, the ILS characteristics described above are independent of the SIS. Instead, they are produced by algorithms inside the GLS receiver. The development of industry standards including the local-area augmentation system (LAAS) and the wide-area augmentation system (WAAS) raises numerous issues concerning the capabilities of these algorithms. Of concern are vertical guidance during glide-slope capture and flare, and lateral guidance during rollout. Other considerations include the impact on field measurement. Compatibility is of special value given the desire to efficiently introduce GLS technology into the anticipated multi-mode landing environment.

SUMMARY OF THE INVENTION

Disclosed are a global navigation satellite system (GNSS) landing system (GLS) and methods of using the same to calculate a vertical deviation from the glide slope of the aircraft. A GNSS antenna and position determining circuitry are used to determine the position of the aircraft as a function of received GNSS positioning signals. Vertical deviation computation circuitry coupled to the position determining circuitry calculates an angular vertical deviation $\alpha_v$ from the glide slope of the aircraft as a function of the total horizontal distance between the aircraft and a GLS elevation reference point (GERP).

DETAILED DESCRIPTION OF AN ILLUSTRATIVE EMBODIMENT

The present invention includes GNSS based avionics systems adapted to provide glide-slope and localizer deviations for precision guidance. The deviation data are used to align the aircraft with the runway and to establish a safe descent path terminating at the touchdown zone of the runway. In the prior art, these functions have been provided by the ILS. The GLS algorithms and methods of the present invention provide a high degree of compatibility with existing aircraft equipment and piloting techniques.

In addition to the ILS characteristics discussed above, two other ILS characteristics are referred to in the following discussions of the GLS algorithms of the present invention: the conical glide-slope antenna pattern, and the dependency of localizer width on runway length. The antenna pattern of the image-array glide-slope is generated using the terrain about the antenna as a reflecting surface. Because the reflecting surface creates a "mirror image" of the antenna phase center under the reflecting surface, surfaces of constant DDM are conical. Also, because the glide-slope array is installed several hundred feet laterally offset from the runway centerline 300 (shown in FIG. 3), the final approach path (i.e., the contour of zero DDM on centerline) is a hyperbola in space. The hyperbolic characteristic becomes most significant for heights within 200 ft of touchdown.

The localizer array is typically located several hundred feet past the stop end of the runway. The array is aligned with the projected runway centerline 300, providing a dominant 90 Hz modulation on the right course and 150 Hz modulation on the left course. For typical runways, the displacement sensitivity of the localizer is adjusted to provide a sensitivity of 0.00145 DDM/meter at the runway threshold. Consistent sensitivity during the final stages of the approach is advantageous, but it also changes the angular width of the localizer, which affects localizer capture. On long runways, the angular width is held to a minimum value of 1.5° per 0.155 DDM, resulting in lower sensitivity than 0.00145 DDM/meter at the threshold. On short runways, the width is held to a maximum value of 3° per 0.155 DDM, which results in a heightened sensitivity at the threshold.

Figure 1:
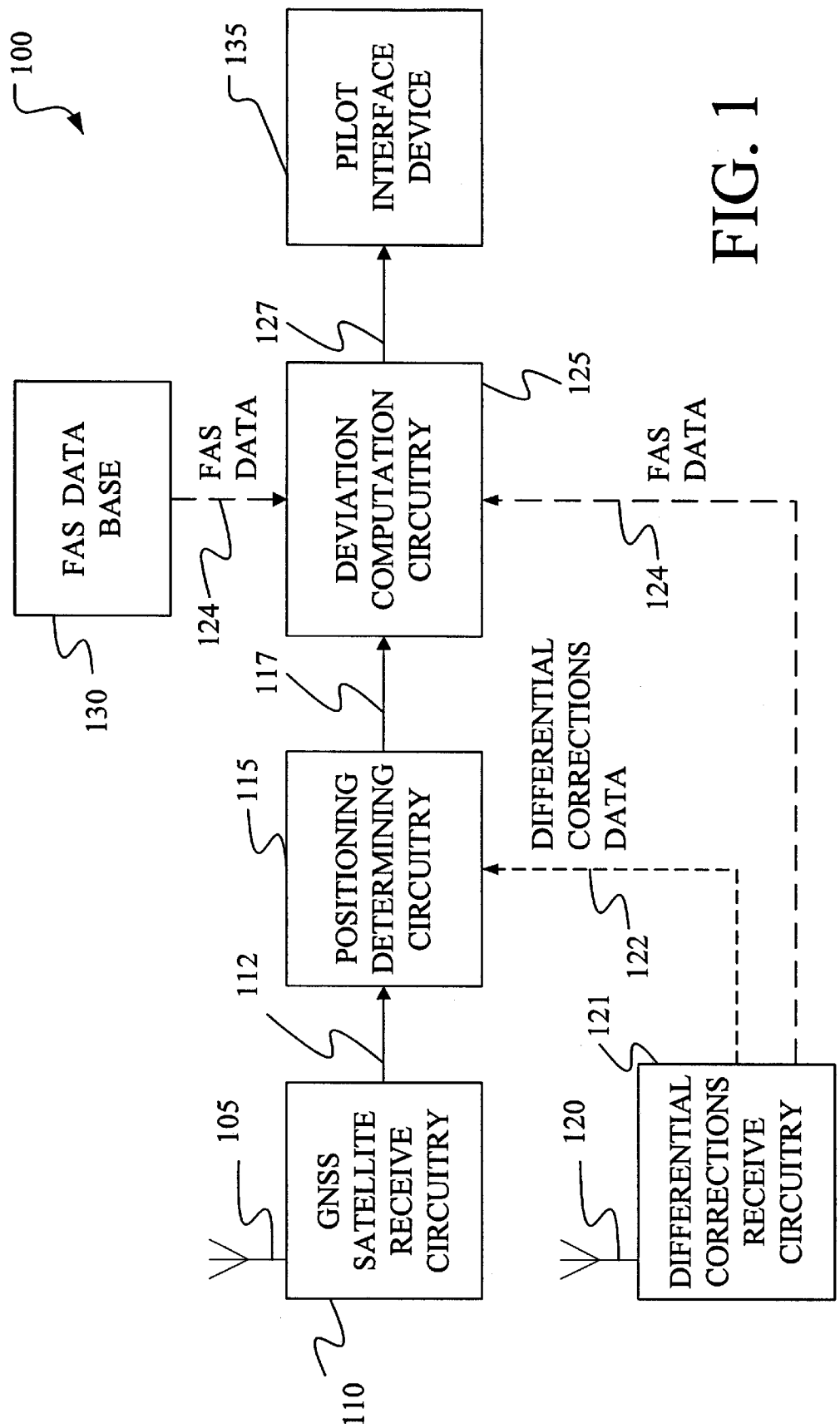
FIG. 1 is a block diagram illustrating a GLS system in accordance with embodiments of the present invention.

FIG. 1 is a block diagram illustrating embodiments of GLS avionics systems of the present invention. As illustrated in FIG. 1, GLS 100 includes GNSS antenna 105, GNSS satellite receive circuitry 110, position determining circuitry 115, and glide slope deviation computation circuitry 125. While in FIG. 1 GLS 100 is shown to include different circuitry to perform different enumerated functions, those skilled in the art will recognize that one or more of the shown circuitry functions can be function implementing programming within a shared or separate processing environment. Pilot interface device 135, which can be a display device or other types of devices providing audible, visual, or other information to the pilot of an aircraft on which GLS 100 is installed, can be shared with other avionics systems and therefore need not be considered a part of GLS 100. Further, pilot interface device 135 can be replaced with flight control computers or other devices for automatically controlling the aircraft as a function of the computed deviations.

Antenna 105 receives GNSS positioning signals from "visible" (i.e., substantially with line of sight) GNSS satellites. GNSS satellite receive circuitry 110 receives the signals from antenna 105 and provides data 112 to position determining circuitry 115. Data 112 is indicative of known GNSS data types such as ephemeris, time and/or almanac data. Circuitry 115 utilizes data 112 in a known manner to implement GNSS position determining functions and provides data 117, indicative of the position of the aircraft, to deviation computation circuitry 125. In embodiments in which GLS 100 is based upon a differential GNSS (DGNSS), system 100 also includes differential corrections receive antenna 120 for receiving differential corrections data signals from a data link or a satellite, and differential corrections receive circuitry 121 for processing the differential corrections data signals and providing differential corrections data 122 to position determining circuitry 115 for use in determining the position of the aircraft.

Deviation computation circuitry 125 computes the vertical glide slope deviation using the position data 117 (and optionally the differential corrections data 122 in DGNSS) and using final-approach segment (FAS) data 124 that defines the final-approach path of the aircraft. If GLS 100 is an airborne LAAS or WAAS type system, GLS 100 calculates the vertical deviations to the glide slope by first determining aircraft position using differential GNSS techniques. The LAAS VHF data broadcast received at antenna 120 allows circuitry 121 to provide differential corrections data 122 and a FAS data block 124 (described below). In alternate embodiments, the WAAS satellite broadcasts are received at antenna 120, allowing circuitry 121 to provide only differential corrections data 122. However, in these embodiments, FAS data 124 will be provided from an on-board data base 130 containing the FAS information. The vertical deviations 127 are then calculated using the algorithms of the present invention described below.

Figure 2:
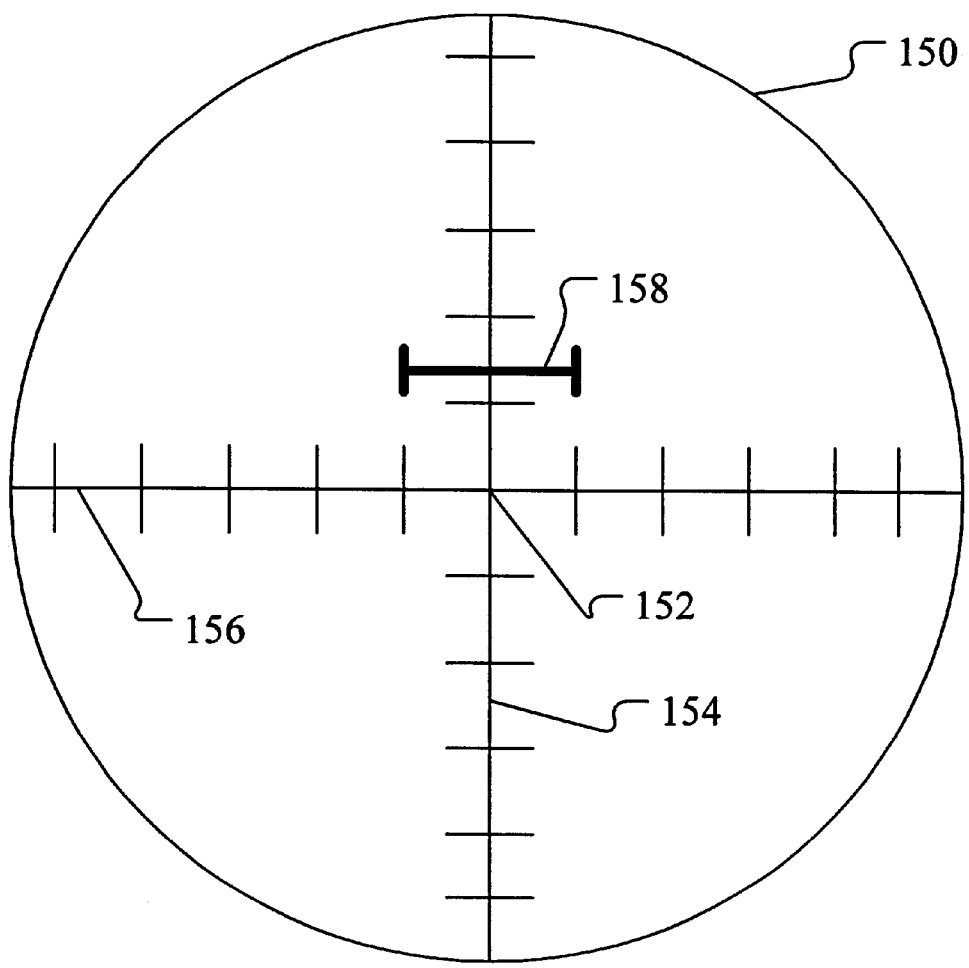
FIG. 2 is a diagrammatic illustration of a display format which can be used to display to the pilot of an aircraft the vertical deviations from the glide slope calculated using methods of the present invention.

The glide slope vertical deviations calculated using the present invention can be displayed to the pilot of the aircraft in any of a wide variety of formats. One such format is illustrated in FIG. 2. In the display format shown in FIG. 2, horizontal line 156 and vertical line 154 cross at center 152 of circle 150. Horizontally extending indicator bar 158 moves up and down relative to center 152 and horizontal line 156 as the calculated vertical deviation changes. If the aircraft is lined up correctly on the 3° (or other desired) glide slope, horizontal indicator 158 will be co-linear with horizontal line 156, indicating no vertical glide slope deviation is necessary. If the difference between the actual flight path and the intended glide slope is a positive angle indicating a pull-up of the aircraft is necessary, horizontal indicator 158 will be below horizontal line 156. If the difference between the actual flight path and the intended glide slope is a negative angle, horizontal indicator 158 will be above horizontal line 156.

Figure 3:
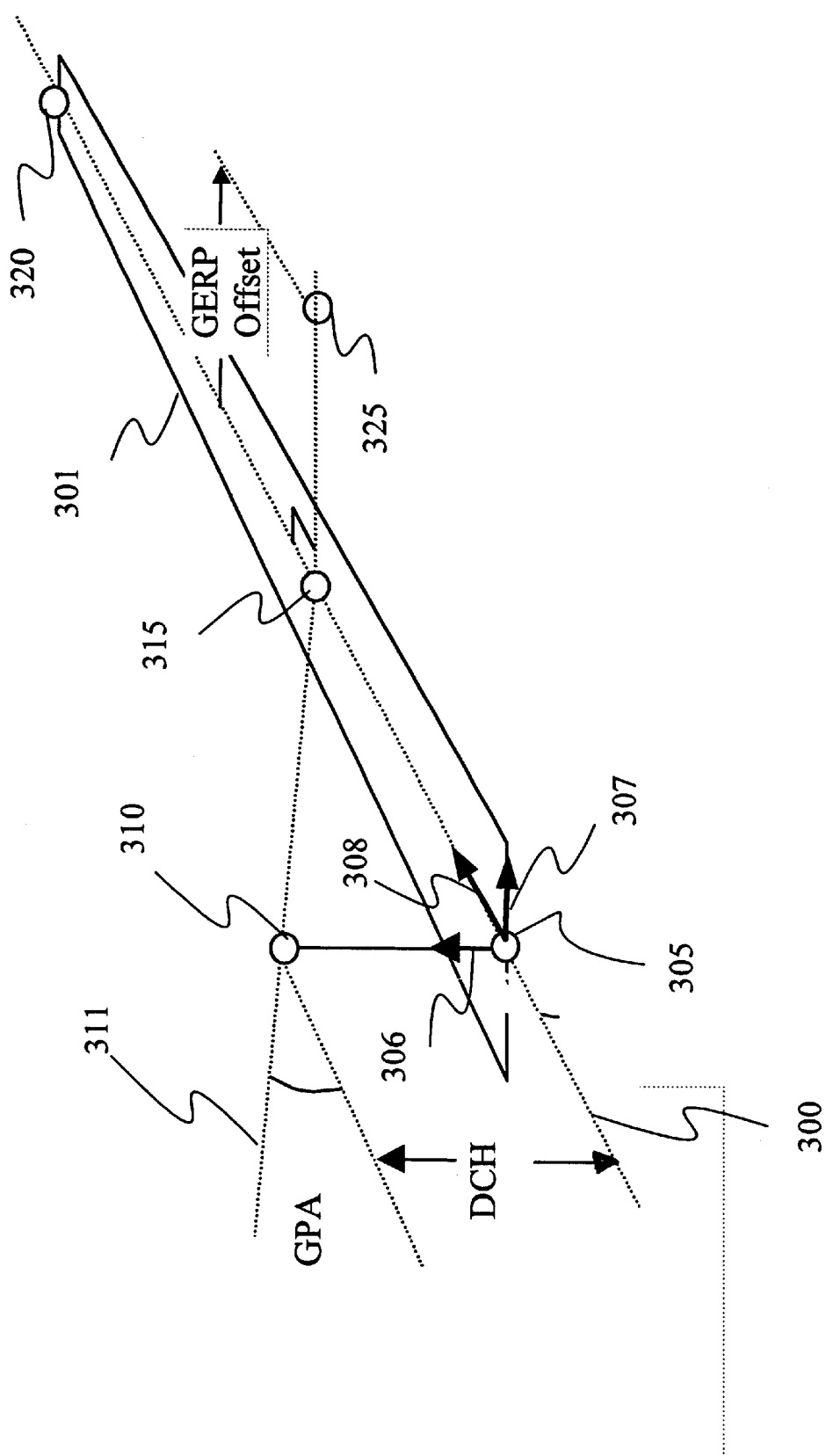
FIGS. 3 and 4 are diagrammatic illustrations of an aircraft runway which show parameters of the methods of the present invention.

As discussed above, the vertical deviation algorithms of the invention use a standard FAS data block, as defined below in the example shown in Table 1 and illustrated with the aid of FIG. 3. Example values of Table 1 are used in the simulations described later with reference to FIGS. 5–8. The algorithms of the present invention can use a Cartesian coordinate system, originating at the reference datum point (RDP) 305 on runway 301, and including perpendicular vertical, cross-track, and longitudinal unit vectors ($u_{vert}$, $u_{lat}$, and $u_{rw}$, respectively). The RDP is a surveyed point typically located at the threshold of the runway being served by the approach. Local vertical vector $u_{vert}$ 306 for the approach is defined as normal to the WGS-84 ellipsoid at the RDP. The WGS-84 ellipsoid is the standard reference datum for the GPS. The local level plane for the approach is defined as a plane perpendicular to the local vertical passing through the RDP 305 (i.e. tangent to the ellipsoid at the RDP). The vectors $u_{lat}$ 307 and $u_{rw}$ 308 lie in the local level plane, with $u_{rw}$ pointing toward the flight path alignment point (FPAP) 320. The FPAP is a second surveyed point typically located at the stop end of the runway being served by the approach. The final approach path 311 of the aircraft is defined as a line at an angle, defined by the glide path angle (GPA), relative to the local level plane passing above RDP 305 at a height defined by the datum crossing height (DCH), which is the intended height of the final-approach segment as it passes over the RDP. The glide-path intercept point (GPIP) 315 is the point where the final approach path 311 intercepts the local level plane. The GPIP may actually be above or below the runway surface depending on the curvature of the runway.

TABLE 1

Final-Approach Segment Parameters

| DATA | DEFINITION | EXAMPLE VALUE |
| --- | --- | --- |
| Runway Datum Point (RDP) | Latitude (WGS-84) Longitude (WGS-84) Height above WGS-84 ellipsoid | N39° 27.83290' W74° 35.43748' −12.2 m |
| Flight Path Alignment Point (FPAP) | Latitude (WGS-84) Longitude | N39° 27.05615' W74° 33.56691' |
| Datum Crossing Height (DCH) | Desired height of the FAS at the RDP | 15.2 m |
| Glide Path Angle (GPA) | Desired descent angle of the FAS | 3° |

In a first embodiment of the present invention, referred to as "ILS look-alike", the glide-slope characteristics described above, including the conical offset glide-slope, are incorporated. The vertical deviations are stated with respect to a GLS elevation reference point (GERP) 325 as illustrated in FIG. 3. In exemplary embodiments of the invention, the GERP 325 is laterally offset from the GPIP 315 by a fixed value of 150 meters (m). However, other offset distances are possible.

Figure 4:
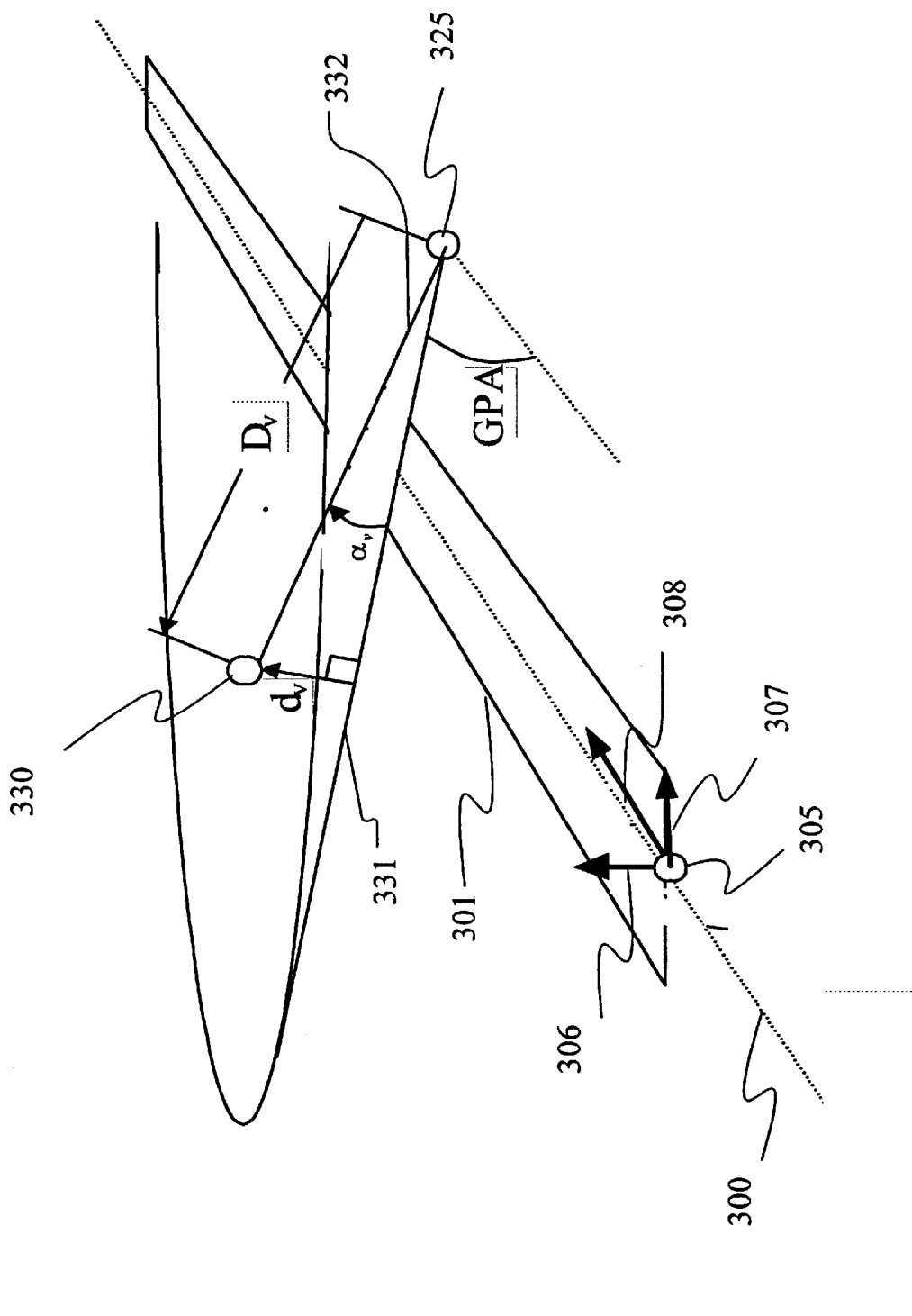

For the sake of convenience, a rectilinear deviation (i.e., a deviation in distance) is defined as well as an angular deviation. The rectilinear vertical deviation ($d_v$ in FIG. 4) is defined as the distance of the computed aircraft guidance control point (GCP) 330 position from the surface 331 of a vertically-oriented circular cone with its apex at GERP 325 and with an angle defined by the GPA. The aircraft's current position is GCP 330. The angular vertical deviation ($\alpha_v$ in FIG. 4) from the glide slope is defined as the angle whose sine is the ratio of the rectilinear vertical deviation dv and the distance ($D_v$ in FIG. 4) from the aircraft (i.e., from the aircraft GCP 330) to the GERP 325.

The angular vertical deviation $\alpha_v$ may be computed as a function of the distance from the aircraft to GERP 325 using the relationship of Equation 1:

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - \text{GPA} \quad \text{Equation 1}$$

where, $\Delta_r$ = the vector 332 extending from GERP 325 to aircraft GCP 330.

The angular vertical deviation is expressed in terms of DDM via Equation 2:

$$\text{Vertical Output} = \frac{0.175 \, \alpha_v}{0.25 \, \text{GPA}} \quad \text{Equation 2}$$

(Note that 0.175 DDM equals 150 $\mu$A). The width is scaled to 25% of glide-path angle, consistent with MLS characteristics, as defined in ICAO Annex 10, which are slightly inconsistent with Annex 10's 24% scaling for ILS. Digital equipment will provide linear scaling beyond the 0.175 DDM full-scale deflection. However, the angular vertical deviations are flagged invalid when the bearing to the GERP is more than ±90° from the FAS bearing (i.e., the aircraft is beyond GPIP 315).

An alternative to the ILS look-alike approach, referred to herein as conical-GPIP, is to define GERP 325 at GPIP 330 (i.e., zero GERP offset). Other than the zero offset (which removes the flare characteristic), the description of conical-GPIP is the same as ILS look-alike described above.

Another alternative to the ILS look-alike approach preserves the conical glide-slope and its flare characteristic, but uses a more complex reference surface, a hyperboloid of two sheets, centered above GPIP 315. Using this method, the angular vertical deviation $\alpha_v$ may be computed as a function of the distance from the aircraft to GERP 325 using Equation 3

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - \alpha_{ref} \quad \text{Equation 3}$$

where, $\Delta_r$ = a vector pointing from GPIP 315 to GCP 330 of the aircraft; and $\alpha_{ref}$ = a position-dependent reference path angle, which may be defined using Equation 4.

$$\alpha_{ref} = \tan^{-1}\left\{\tan(\text{GPA})\sqrt{\frac{D^2_{GERP}}{[u_{lat} \cdot \Delta r]^2 + [u_{rw} \cdot \Delta r]^2} + 1}\right\} \quad \text{Equation 4}$$

where, $D_{GERP}$ = the lateral GERP offset of a conical glide-slope providing an equivalent flare characteristic along the procedure centerline.

Using this method, output scaling is the same as ILS look-alike (along the centerline).

Figure 5:
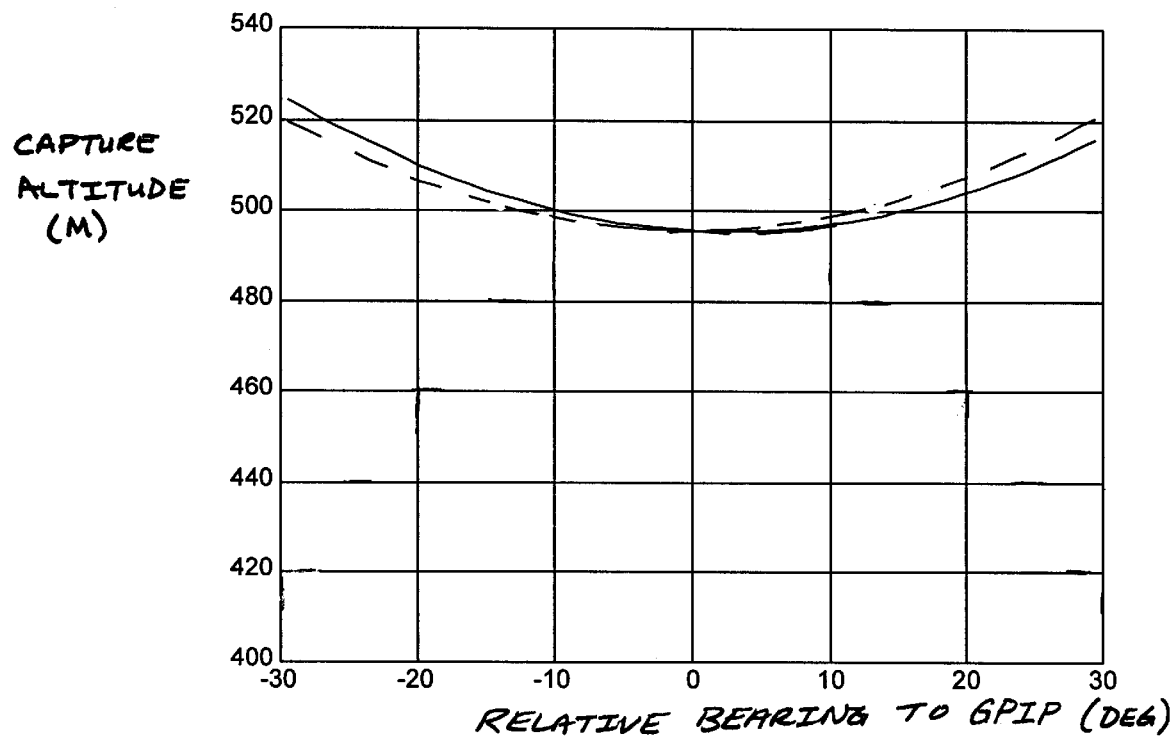
FIGS. 5–8 are plots illustrating performance characteristics of various embodiments of the present invention.
Figure 6:
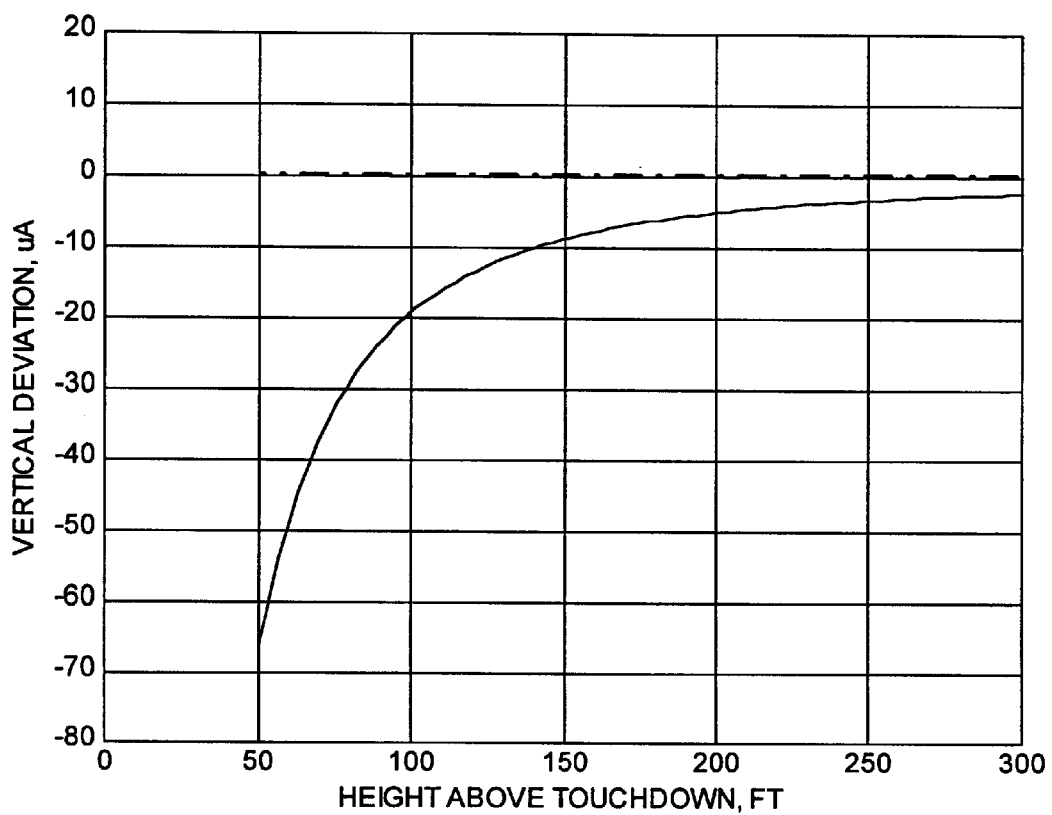

Glide-slope capture characteristics have emerged as a potential problem for planar deviations. FIG. 5 compares the capture altitudes of the proposed GLS algorithms. The results are obtained by flying a simulated orbit about FPAP 320 at a distance of approximately 6.6 nautical miles (nm) corresponding to 5 nm from the RDP when on course. When the bearing is more than ±4° of centerline 300, the altitude differences are more than 4 meters (m), and the LAAS specified 95% system accuracy is 4 m. Therefore, differences in glide-slope capture characteristics are important if glide-slope is captured before localizer. This is technically possible for GLS, so the lower capture altitude of the planar deviations may be a valid concern. Note the slight asymmetry of the ILS look-alike vs. the conical-GPIP and hyperboloid algorithms. This asymmetry is an unintended feature of the ILS, but it creates no known operational concerns.

Whether the flare characteristic provided by the ILS is needed has been an important issue. The low-altitude characteristics of the GLS algorithms are compared in FIG. 6. The result is obtained by flying a straight-in approach intercepting GPIP 315 with a 3° GPA. A recent study on the integration of GLS with an existing air-transport flight-control system inadvertently re-discovered the value of the flare characteristic. The Monte Carlo analysis compared the ILS and GLS touchdown footprints using Joint Airworthiness Requirements-All Weather Operation (JAR-AWO) certification criteria for a certified CAT-IIIb auto-land system. CAT-IIIb meaning that the system is capable of operating with runway visual range limited to 700 ft and with no minimum altitude constraint. The initial results exhibited a mean offset (i.e., bias) between the two footprints. Further investigation showed that the simulated GLS, which used a planar vertical deviation characteristic, was causing the system to land short of the ILS by a significant amount as compared to the JAR-AWO acceptance criteria. Whether or not a particular auto-land system is affected by the ILS flare depends on the system's particular gain scheduling characteristics (e.g., how radio altimeter is blended in). Justification for elimination of the flare characteristic would appear to involve significant analyses of the installed systems. This is a factor behind inclusion of a lateral offset in the ILS Look-Alike approach.

Field evaluation of GLS could be used to ensure correct promulgation of the FAS data and to validate that the LAAS supports the intended operation. To perform these evaluations it is beneficial to separate known design characteristics from actual errors. A basic tool for performing ILS field evaluations is an optical theodolite, which is situated near the glide-slope mast. By adjusting the angular orientation of the theodolite to track an instrumented aircraft on the approach, the instrument inherently generates a conical measure of "truth" for glide-slope evaluations. Therefore, the ILS look-alike approach is directly measurable through current field-evaluation methods (i.e., where it is currently sited).

Figure 7:
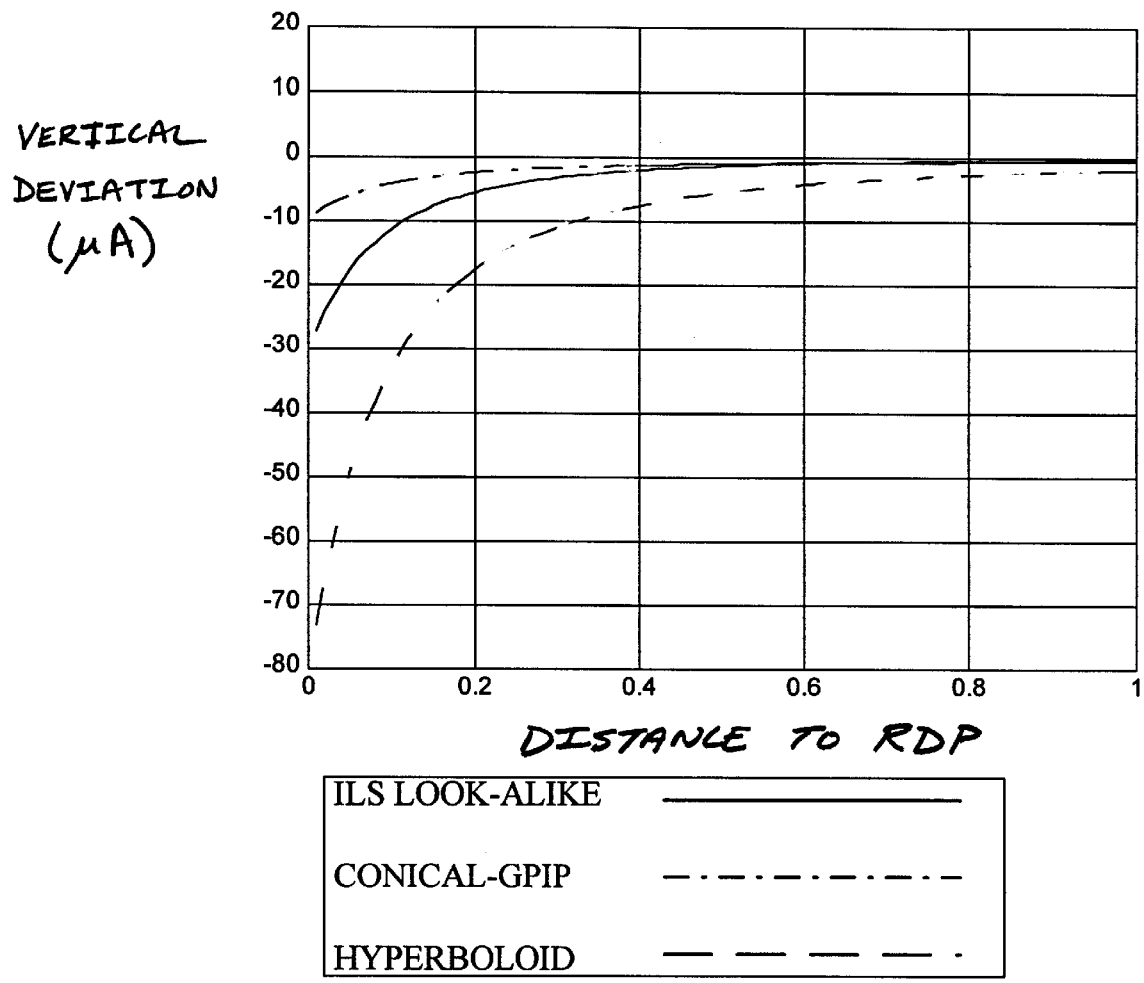

The impact of the alternative approaches is illustrated by simulating the proposed algorithms for a 3° approach with a 1° offset (to simulate flight technical error). The results of this simulation, as shown in FIG. 7, indicate that a theodolite would observe approximately 20–40 uA raw error during field evaluations if the receiver implements conical-GPIP, or hyperboloid methods. Equipment which uses these methods can be used effectively only by a flight reference system capable of three-dimensional positioning (e.g., a DGPS reference system or an automatic flight-inspection system). While such systems are used in more developed countries, it is nonetheless clear that field-evaluation specialists and flight-inspection system developers will need to understand the form of the GLS guidance algorithms implemented by their equipment in order to effectively evaluate GLS in the field. The ILS look-alike approach has an inherent compatibility with existing systems.

Figure 8:
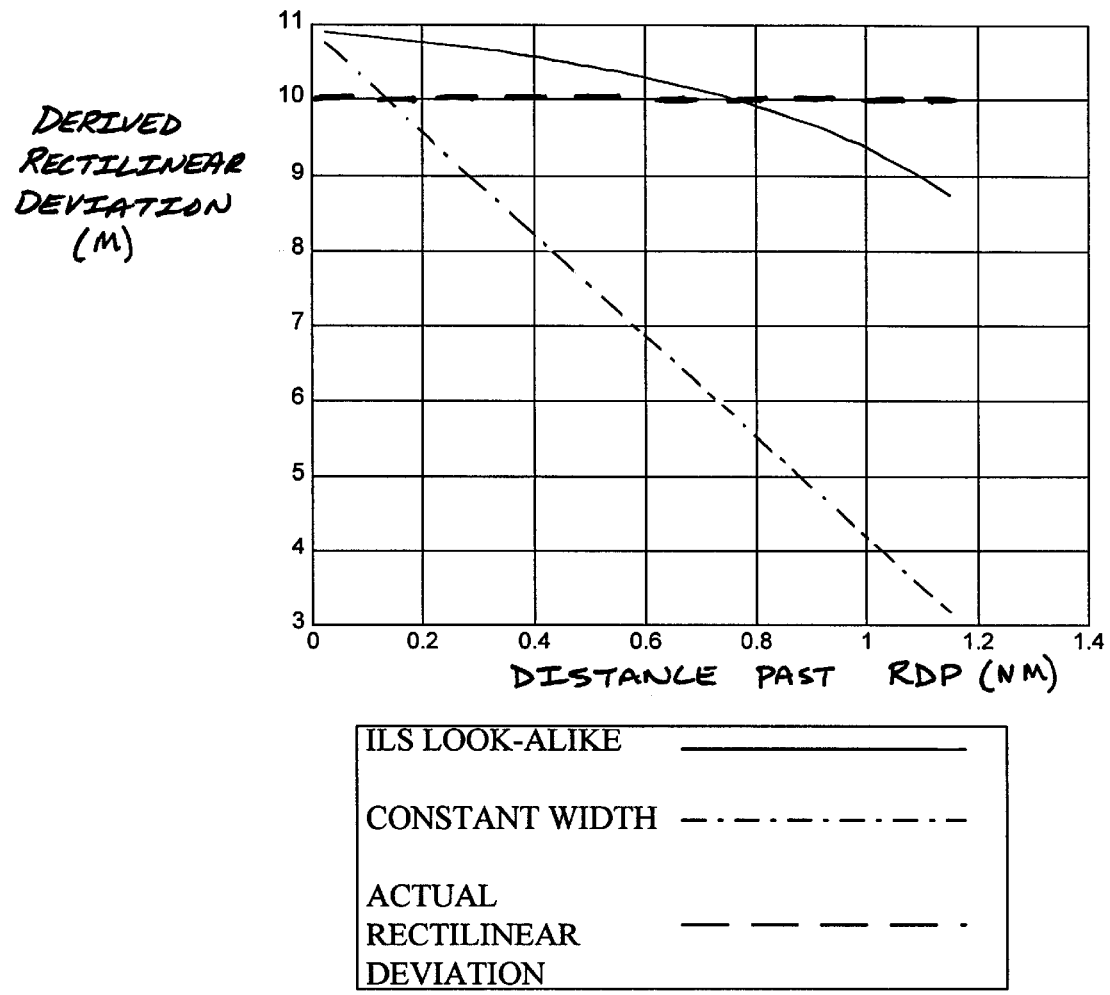

Referring now to FIG. 8, a comparison of roll-out characteristics is provided. Current Category IIIb auto-land systems provide a rollout function using ILS lateral guidance. These systems must regulate lateral displacement using internally computed estimates of rectilinear deviation. An example of such an estimate is shown in Equation 5:

$$\hat{d}_{lat} = \hat{s}\alpha_{lat}\hat{D}_{lat} = \alpha_{lat}(D_{lat}+e_D)(s+e_s) \quad \text{Equation 5}$$

where,
- s=actual scaling from DDM to radians;
- $e_D$=a bias in the determination of distance to the localizer; and
- $e_s$=an error in scaling from DDM to radians.

FIG. 8 compares a hypothetical estimated $d_{lat}$ computed during a simulated rollout with a constant lateral displacement of 10 meters from the runway centerline 300. Using the ILS look-alike method, a 10% error is incurred due to simulated $e_D$ and $e_s$. However, the constant-width method would produce significant under estimate of the 10-meter error. It is clear that systems using the constant-width method will require significant analysis of rollout characteristics of the installed system.

Mitigating this issue is the expectation that next generation auto landing systems will be able to take advantage of the rectilinear deviation outputs directly provided by GLS to by pass the estimation process. It also should be noted that the fixed width and consistent sensitivity of the fixed-width approach are operational advantages for Category I systems (systems capable of operating with runway visual range limited to ¼ nm and with a minimum altitude constraint of 200 ft), for which rollout guidance is a non-issue.

The present invention includes a Multi-Mode Receiver (MMR) which combines ILS, MLS, and GLS precision-landing modes in a single line replaceable unit (LRU). The MMR is intended to support display and auto-land systems from a common set of digital or analog interfaces. Use of the ILS look-alike method will enable greater autopilot and display-system commonality between landing modes. This is of particular significance for retrofit applications, where re-design of existing systems is prohibitive.

Although the present invention has been described with reference to illustrative embodiments, workers skilled in the art will recognize that changes may be made in form and detail without departing from the spirit and scope of the invention.

What is claimed is:

1. A global navigation satellite system (GNSS) landing system (GLS) for use in an aircraft preparing to land on a runway, the GLS comprising:

a GNSS antenna adapted to receive GNSS positioning signals from a plurality of GNSS satellites;

position determining circuitry coupled to the GNSS antenna and adapted to determine a position of the aircraft as a function of the received GNSS positioning signals; and vertical deviation computation circuitry coupled to the position determining circuitry and adapted to calculate an angular vertical deviation $\alpha_v$ from a glide slope of the aircraft as a function of a total horizontal distance between the aircraft and a GLS elevation reference point (GERP) using the relationship:

$$\sqrt{[u_{lat}\cdot\Delta r]^2 + [u_{rw}\cdot\Delta r]^2}$$

where $u_{rw}$ is a vector which extends from a reference datum point (RDP) toward a flight path alignment point (FPAP) co-linear with the center line of the runway, where $u_{lat}$ is a vector which extends from the RDP in a direction perpendicular to vector $u_{rw}$, and where $\Delta r$ is a vector extending from a glide path intercept point (GPIP) on the center line of the runway toward a guidance control point (GCP) of the aircraft;

wherein the GERP is offset laterally from a center line of the runway.

2. The GLS of claim 1, wherein the vertical deviation computation circuitry is further adapted to calculate the angular vertical deviation $\alpha_v$ from the glide slope of the aircraft as a function of final approach segment (FAS) data corresponding to the runway.

3. The GLS of claim 2, and further comprising:

a differential corrections receive antenna adapted to receive differential corrections signals; and differential corrections receive circuitry coupled to the differential corrections receive antenna and adapted to provide differential corrections data to the position determining circuitry as a function of the differential corrections signals.

4. The GLS of claim 3, wherein the differential corrections receive antenna is also adapted to receive the FAS data corresponding to the runway and to provide the FAS data to the vertical deviation computation circuitry.

5. The GLS of claim 3, and further comprising a FAS data base coupled to the vertical deviation computation circuitry and providing the FAS data to the vertical deviation computation circuitry.

6. The GLS of claim 1, wherein the vertical deviation computation circuitry is adapted to calculate the angular vertical deviation $\alpha_v$ from the glide slope of the aircraft using the relationship:

$$\alpha_v = \tan^{-1}\left\{\frac{[u_{vert}\cdot\Delta r]}{\sqrt{[u_{lat}\cdot\Delta r]^2 + [u_{rw}\cdot\Delta r]^2}}\right\} - \text{GPA}$$

where $U_{vert}$ is a vector which extends from the RDP in a direction perpendicular to vectors $u_{rw}$ and $u_{lat}$, and where GPA is a glide path angle of the aircraft.

7. The GLS of claim 1, wherein the vertical deviation computation circuitry is adapted to calculate the angular vertical deviation $\alpha_v$ from the glide slope of the aircraft using the relationship:

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - \alpha_{ref}$$

where $u_{vert}$ is a vector which extends from the RDP in a direction perpendicular to vectors $u_{rw}$ and $u_{lat}$, and where $\alpha_{ref}$ is a position dependent reference path angle for the aircraft.

8. A method of generating an angular vertical deviation $\alpha_v$ from a glide slope of an aircraft using a global navigation satellite system (GNSS) landing system (GLS), the method comprising:

receiving GNSS positioning signals from a plurality of GNSS satellites;

determining a position of the aircraft as a function of the received GNSS positioning signals; and calculating the angular vertical deviation $\alpha_v$ from the glide slope of the aircraft as a function of a total horizontal distance between the position of the aircraft and a GLS elevation reference point (GERP) using the relationship:

$$\sqrt{[u_{lat} \cdot \Delta r]^2 + [u_{rw} \cdot \Delta r]^2}$$

where $u_{rw}$ is a vector which extends from a reference datum point (RDP) toward a flight path alignment point (FPAP) co-linear with the center line of the runway, where $u_{lat}$ is a vector which extends from the RDP in a direction perpendicular to vector $u_{rw}$, and where $\Delta r$ is a vector extending from a glide path intercept point (GPIP) on the center line of the runway toward a guidance control point (GCP) of the aircraft.

9. The method of claim 8, wherein calculating the angular vertical deviation $\alpha_v$ as a function of a total horizontal distance between the position of the aircraft and the GERP further comprises calculating the angular vertical deviation $\alpha_v$ as a function of final approach segment (FAS) data corresponding to the runway.

10. The method of claim 9, and further comprising:

receiving differential corrections and the FAS data with a differential corrections receive antenna; and wherein determining the position of the aircraft as a function of the received GNSS positioning signals further comprises determining the position of the aircraft as a function of the received differential corrections.

11. The method of claim 9, and further comprising retrieving the FAS data from a FAS data base on board the aircraft.

12. The method of claim 8, wherein calculating the angular vertical deviation $\alpha_v$ from the glide slope of the aircraft as a function of the total horizontal distance between the position of the aircraft and the GERP further comprises calculating the angular vertical deviation $\alpha_v$ from the glide slope of the aircraft as a function of a total horizontal distance between the position of the aircraft and the a point positioned such that it is offset laterally from a center line of the runway.

13. The method of claim 8, wherein calculating the angular vertical deviation $\alpha_v$ from the glide slope of the aircraft as a function of the total horizontal distance between the position of the aircraft and the GERP further comprises calculating the angular vertical deviation $\alpha_v$ using the relationship:

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - GPA$$

where $u_{vert}$ is a vector which extends from the RDP in a direction perpendicular to vectors $u_{rw}$ and $u_{lat}$, and where GPA is a glide path angle of the aircraft.

14. The method of claim 8, wherein calculating the angular vertical deviation $\alpha_v$ from the glide slope of the aircraft as a function of the total horizontal distance between the position of the aircraft and the GERP further comprises calculating the angular vertical deviation $\alpha_v$ using the relationship:

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - \alpha_{ref}$$

where $u_{vert}$ is a vector which extends from the RDP in a direction perpendicular to vectors $u_{rw}$ and $u_{lat}$, and where $\alpha_{ref}$ is a position dependent reference path angle for the aircraft.

15. A global navigation satellite system (GNSS) landing system (GLS) for use in an aircraft preparing to land on a runway, the GLS comprising:

a GNSS antenna adapted to receive GNSS positioning signals from a plurality of GNSS satellites;

position determining circuitry coupled to the GNSS antenna and adapted to determine a position of the aircraft as a function of the received GNSS positioning signals; and vertical deviation computation circuitry coupled to the position determining circuitry and adapted to calculate an angular vertical deviation $\alpha_v$ from the glide slope of the aircraft as a function of a total horizontal distance between the aircraft and a GLS elevation reference point (GERP) using the relationship:

$$\sqrt{[u_{lat} \cdot \Delta r]^2 + [u_{rw} \cdot \Delta r]^2}$$

where $u_{rw}$ is a vector which extends from a reference datum point (RDP) toward a flight path alignment point (FPAP) co-linear with the center line of the runway, where $u_{lat}$ is a vector which extends from the RDP in a direction perpendicular to vector $u_{rw}$, and where $\Delta r$ is a vector extending from a glide path intercept point (GPIP) on the center line of the runway toward a guidance control point (GCP) of the aircraft.

16. The GLS of claim 15, wherein the vertical deviation computation circuitry is further adapted to calculate the angular vertical deviation $\alpha_v$ from the glide slope of the aircraft as a function of final approach segment (FAS) data corresponding to the runway.

17. The GLS of claim 16, and further comprising:

a differential corrections receive antenna adapted to receive differential corrections signals; and differential corrections receive circuitry coupled to the differential corrections receive antenna and adapted to provide differential corrections data to the position determining circuitry as a function of the differential corrections signals.

18. The GLS of claim 17, wherein the differential corrections receive antenna is also adapted to receive the FAS data corresponding to the runway and to provide the FAS data to the vertical deviation computation circuitry.

19. The GLS of claim 15, wherein the vertical deviation computation circuitry is adapted to calculate the angular vertical deviation $\alpha_v$ from the glide slope of the aircraft using the relationship:

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - GPA$$

where $u_{vert}$ is a vector which extends from the RDP in a direction perpendicular to vectors $u_{rw}$ and $u_{lat}$, and where GPA is a glide path angle of the aircraft.

20. The GLS of claim 15, wherein the vertical deviation computation circuitry is adapted to calculate the angular vertical deviation $\alpha_v$ from the glide slope of the aircraft using the relationship:

$$\alpha_v = \tan^{-1}\left\{\frac{[u_{vert} \cdot \Delta r]}{\sqrt{[u_{lat} \cdot \Delta r]^2 + [u_{rw} \cdot \Delta r]^2}}\right\} - \alpha_{ref}$$

where $u_{vert}$ is a vector which extends from the RDP in a direction perpendicular to vectors $u_{rw}$ and $u_{lat}$, and where $\alpha_{ref}$ is a position dependent reference path angle for the aircraft.

* * * * *